(12) United States Patent
Takahashi et al.

(10) Patent No.: US 11,916,243 B2
(45) Date of Patent: Feb. 27, 2024

(54) CELL CASE OF SECONDARY BATTERY AND BATTERY MODULE

(71) Applicant: NIPPON STEEL CORPORATION, Tokyo (JP)

(72) Inventors: Takehiro Takahashi, Tokyo (JP); Akinobu Kobayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/020,407

(22) PCT Filed: Sep. 7, 2021

(86) PCT No.: PCT/JP2021/032898
§ 371 (c)(1),
(2) Date: Feb. 8, 2023

(87) PCT Pub. No.: WO2022/080042
PCT Pub. Date: Apr. 21, 2022

(65) Prior Publication Data
US 2023/0231250 A1 Jul. 20, 2023

(30) Foreign Application Priority Data
Oct. 16, 2020 (JP) ................................. 2020-174868

(51) Int. Cl.
H01M 10/613 (2014.01)
H01M 50/103 (2021.01)
(Continued)

(52) U.S. Cl.
CPC ....... H01M 50/204 (2021.01); H01M 10/613 (2015.04); H01M 50/103 (2021.01); H01M 50/15 (2021.01); H01M 50/202 (2021.01)

(58) Field of Classification Search
CPC .. H01M 50/15; H01M 50/103; H01M 50/202; H01M 50/204; H01M 10/613
See application file for complete search history.

(56) References Cited

U.S. PATENT DOCUMENTS 7,968,163 B2 * 6/2011 Tadaki .................... B32B 15/09
428/35.8
10,756,398 B2 * 8/2020 Melack ............... H01M 50/375
(Continued)

FOREIGN PATENT DOCUMENTS

JP 6-338304 A 12/1994
JP 2003-36819 A 2/2003
(Continued)

Primary Examiner — Milton I Cano
Assistant Examiner — Mary G Henshaw
(74) Attorney, Agent, or Firm — Birch, Stewart, Kolasch & Birch, LLP

(57) ABSTRACT

A cell case of a secondary battery having a rectangular tube-shaped can body, a can bottom double seamed to a bottom end of the can body, and a can lid double seamed to a top end of the can body, in which cell case of a secondary battery, an area ratio S1 of part of the can bottom, including a portion 1 between a plane vertical to the can body a distance of 0.5 mm above a bottom end of a double seam of the can body and the can bottom and a plane vertical to the can body a distance of 1.0 mm below the bottom end of the double seam, with respect to a cross-sectional area of the can body at the bottom end of the double seam is 50% or more, and a battery module having a plurality of such cell cases are provided.

18 Claims, 4 Drawing Sheets

(51) Int. Cl.
    *H01M 50/15*         (2021.01)
    *H01M 50/202*      (2021.01)
    *H01M 50/204*      (2021.01)

(56) References Cited

U.S. PATENT DOCUMENTS

| | | | |
|---|---|---|---|
| 2003/0017384 A1 | 1/2003 | Marukawa et al. | |
| 2009/0206096 A1* | 8/2009 | Hirotsu | H01M 50/1243 |
| | | | 72/347 |
| 2011/0250485 A1* | 10/2011 | Tsukuda | H01M 10/0481 |
| | | | 429/153 |
| 2015/0318585 A1 | 11/2015 | Morisaku et al. | |
| 2021/0184244 A1* | 6/2021 | Taniuchi | H01M 50/119 |
| 2022/0037722 A1* | 2/2022 | Jeong | H01M 50/291 |
| 2023/0045132 A1* | 2/2023 | Lim | H01M 50/153 |

FOREIGN PATENT DOCUMENTS

| | | | |
|---|---|---|---|
| JP | 2008010190 A * | 1/2008 | |
| JP | 2009-110832 A | 5/2009 | |
| JP | 2014041724 A * | 3/2014 | |
| JP | 2018-60595 A | 4/2018 | |
| WO | WO 2006/123666 A1 | 11/2006 | |
| WO | WO 2014/091998 A1 | 6/2014 | |

\* cited by examiner

CROSS-SECTION OF BOTTOM PART (SHAPE OF CAN BOTTOM)

REFERENCE EXAMPLE 1

EXAMPLE A

EXAMPLE B

SEAM BOTTOM END

POSITION OF CONVEX PART OF CAN BOTTOM (HEIGHT)

RECESS (CONCAVE DISTANCE)

CONVEX PART OF CAN BOTTOM

RECESS (CONCAVE DISTANCE)

CELL CASE OF SECONDARY BATTERY AND BATTERY MODULE

FIELD

The present invention relates to a cell case of a secondary battery, more particularly a cell case of a secondary battery comprised of a can body to which a can bottom is double seamed and a battery module containing that cell case of a secondary battery.

BACKGROUND

Due to the advances in electrical technology in recent years, there has been progress in boosting the performance, reducing the size, raising the energy, and improving the portability of electronic equipment and progress in improving the performance of electrically driven automobiles. Excellent can body strength, liquid leakage resistance, hermeticity, heat dissipation, etc. are demanded from the cell cases of the various secondary batteries used as sources of electric drive power.

Resistance to leakage of contents over a long period of time and maintenance of high hermeticity after being filled with power generating materials are demanded from the cell cases of secondary batteries and cases for various types of electrical equipment. The resistance to leakage of contents and hermeticity of these cases are governed by the joined state of the body part of the can, the sealed state of the body part of the can and the lid, etc.

Further, a secondary battery generates heat during the charging and discharging operations and is affected in performance depending on the temperature, so it is considered important to cool the battery to suitably manage the temperature. Therefore, various methods for cooling have been used.

PTL 1 discloses integrally burying metal sheets in side walls of a prismatic battery case (battery container), providing heat transfer parts sticking out from the battery case (battery container) at least at single sides of the metal sheets, and having these heat projecting heat transfer parts contact heat exchange surfaces (cooling surfaces) of a heat exchanger. The fact that the side walls of the battery case (battery container) as a whole can be evenly cooled through the projecting heat transfer parts is described. Note that, hermetically sealing the top opening of the prismatic battery case (battery container) by a lid member provided with a safety valve to produce a prismatic battery is described.

PTL 2 discloses a prismatic battery provided with a wound electrode partially having a curved surface and a prismatic case housing a wound electrode and provided with thermal conductivity. At least part of the inside surface of the prismatic case is formed into a shape running along the curved surface of the wound electrode. It is described that due to this, the gap between the inside surface of the prismatic case and the wound electrode is reduced, the contact area of the inside surface of the prismatic case and wound electrode becomes broader, and the heat conduction is improved, so the wound electrode can be efficiently reduced in heat. Furthermore, it is proposed to place a heat dissipating plate at the bottom surface of the prismatic battery, render the heat dissipating plate and battery a thermally conductive state, and cool the heat dissipating plate to thereby cool the battery from the bottom surface. Note that, regarding the sealing of the prismatic case, it is disclosed to insert the wound electrode from the open part of the closed bottom cylindrical outer can, inject the electrolyte, then close the open part by a sealing plate and seal it by laser welding etc.

PTL 3 relates to enhancement of the insulating ability of a battery stack comprised of a plurality of secondary battery cells stacked together. It discloses placing a cooling plate at a bottom surface side of the battery stack and conducting the heat generated by the secondary battery cells to the cooling plate to promote heat dissipation of the battery stack. Note that it is described that the container of the secondary battery cells is comprised of a prismatic container with an outer can formed into a closed bottom cylindrical shape with an open top and with the open part closed by a sealing plate.

On the other hand, in a two-piece can such as used in PTLs 1 to 3 (can comprised of a closed bottom container and a lid member), the closed bottom container is usually produced by deep drawing, so there is the problem of insufficient can body strength due to structural limitations of the closed bottom part. PTL 4 proposes a three-piece can structure able to solve this problem (shortage of can body strength) (can comprised of can body part, top lid, and bottom lid). Specifically, PTL 4 discloses working the open parts of the two ends of the can body part to cause necking and forming double seams at the top lid and bottom lid to fasten them to those parts through an organic compound.

CITATIONS LIST

Patent Literature

[PTL 1] Japanese Unexamined Patent Publication No. 2003-36819
[PTL 2] Japanese Unexamined Patent Publication No. 2009-110832
[PTL 3] Japanese Unexamined Patent Publication No. 2018-60595
[PTL 4] WO2006/123666

SUMMARY

Technical Problem

As proposed in PTLs 1 to 3, promoting cooling of a battery through the bottom part of the container of the battery has been proposed. On the other hand, as proposed in PTL 4, a battery container obtained by making the container of the battery a three-piece can structure (can comprised of a can body part, top lid, and bottom lid) and forming double seams fastening the three portions to seal them has been disclosed.

However, double seaming joins the end parts of a plurality of sheet members by superposing them, curling up those locations, and crimping them together. Necessarily, the double seamed locations end up sticking out. That is, in a container obtained by double seaming, the double seams are present in a form projecting out at the end parts of the container.

Further, a battery generates heat during the charging and discharging operations and is affected in performance depending on the temperature, so it is considered important to cool the battery to suitably manage the temperature. Therefore, various methods for cooling have been proposed, but usually the battery case is set in a cooling device to cool the battery. Furthermore, sometimes a thermal pad (cooling sheet) is sandwiched between the battery case and the cooling device to raise the cooling efficiency.

When cooling a battery case by a cooling device or using a cooling sheet in this way, if the above-mentioned double seams are present sticking out from the end parts of the container, the cooling surface of the cooling device or the cooling sheet will contact the double seam. The problem arises that the surface of the battery case cannot be efficiently contacted and the cooling efficiency falls.

Further, batteries are sometimes used in a battery module combining a plurality of individual batteries. Such a battery module has the advantage of ease of adjustment of the operating voltage, battery capacity, etc. in accordance with the specifications required by the final product at which it is used and has been widely used. However, since a battery module is comprised of a group of individual cells, only naturally, the problem easily arises that the greater the number of cells, the more the above-mentioned cooling efficiency falls.

In consideration of the above, the present invention has as its object the provision of a cell case of a secondary battery comprised of a can body to which a can bottom is curled and crimped, in which cell case, it is possible to solve the problem of the drop in cooling efficiency due to the presence of a double seam when cooling such a cell case by a cooling device or using a cooling sheet and the provision of a battery module having a plurality of such cell cases.

Solution to Problem

The inventors intensively studied the above problem, whereupon they discovered that the cooling efficiency can be improved when making the can bottom a substantially convex structure to facilitate contact between the cooling sheet and can bottom. Furthermore, based on this discovery, they came up with the technical idea of making a certain area or more of the bottom of the battery case (can bottom) be positioned at the position of the double seam so as to raise the cooling efficiency and thereby completed the present invention.

Due to the present invention, the following are provided:
[1] A cell case of a secondary battery having a rectangular tube-shaped can body, a can bottom double seamed to a bottom end of the can body, and a can lid double seamed to a top end of the can body, in which cell case of a secondary battery,
an area ratio S1 of part of the can bottom, comprised of a portion 1 between a plane vertical to the can body a distance of 0.5 mm above a bottom end of a double seam of the can body and the can bottom and a plane vertical to the can body a distance of 1.0 mm below the bottom end of the double seam, with respect to a cross-sectional area of the can body at the bottom end of the double seam is 50% or more.
[2] The cell case of a secondary battery according to [1], wherein an area ratio S2 of part of the can bottom, comprised of a portion 2 between a plane vertical to the can body including the bottom end of the double seam and a plane vertical to the can body a distance of 1.0 mm below the bottom end of the double seam, with respect to the cross-sectional area of the can body at the bottom end of the double seam is 50% or more.
[3] The cell case of a secondary battery according to [1], wherein the area ratio S1 is 70% or more.
[4] The cell case of a secondary battery according to [2], wherein the area ratio S2 is 70% or more.
[5] The cell case of a secondary battery according to any one of [1] to [4], wherein a sheet thickness of the can bottom is 0.20 mm or less.
[6] A battery module having a plurality of secondary batteries, in which battery module,
the cell cases of the plurality of secondary batteries are cell cases of secondary batteries according to any one of [1], [3], and [5], the respective portions 1 of the plurality of cell cases of secondary batteries contact thermal pads, and the thermal pads contact cooling devices.
[7] A battery module having a plurality of secondary batteries, in which battery module,
the cell cases of the plurality of secondary batteries are cell cases of secondary batteries according to any one of [2], [4], and [5], the respective portions 2 of the plurality of cell cases of secondary batteries contact thermal pads, and the thermal pads contact cooling devices.
[8] A battery module having a plurality of secondary batteries, in which battery module,
the cell cases of the plurality of secondary batteries are cell cases of secondary batteries according to any one of [2], [4], and [5], and the respective portions 2 of the can bottoms of the plurality of cell cases of secondary batteries directly contact cooling devices.

The meanings of the terms relating to batteries used in this Description are defined by JIS D0114: 2000 "Glossary of Terms Relating to Electric Vehicle (Batteries)". Specific examples are shown below:

The "seru" in the Japanese original specification is usually translated as a "cell" according to the JIS and is defined as the "smallest unit forming a battery".

The "denchi" in the Japanese original specification is usually translated as a "battery" and is defined as "a device generating a potential difference across electrodes by the action of a chemical change, temperature difference, light, etc. In an electric vehicle, in general a 'battery' indicates a 'secondary battery'". In the present invention, to clarify the content more, however, when a secondary battery is intended, a "secondary battery" will be explicitly described.

Note that, "cell case" is not defined by this JIS, but in this Description, it means a case containing a cell. A "case", according to the Oxford English Dictionary, is defined as a container designed to hold or protect something or an external protective cover of a natural or manufactured object. Inside of the cell case, a cell, that is, component elements of a cell such as electrodes, electrolyte, separators, etc. can be contained.

The "mojuru" in the Japanese original specification is usually translated as a "battery module" and is defined as "a battery obtained by joining a predetermined number of individual batteries to form a single module". A battery module can connect and fasten cell cases together and enables the operating voltage, battery capacity, etc. to be freely adjusted.

Advantageous Effects of Invention

According to the present invention, by making a certain part of a bottom of a cell case of a secondary battery (can bottom) be positioned in a certain range with respect to a position of a double seam, it is possible to make a surface of a can bottom of a cell case efficiently contact a cooling surface of a cooling device or a thermal pad (cooling sheet) and possible to raise a cooling efficiency.

Further, the cell case of a secondary battery according to the present invention is formed by double seaming a can bottom to a can body, so it is possible to raise the strength compared with a battery cell case formed from a closed bottom container by deep drawing etc. (so-called two-piece can etc.)

BRIEF DESCRIPTION OF DRAWINGS

FIG. 4-1 is a view schematically showing a Reference Example 1 of a cross-section of a bottom part of a battery cell case (container), in other words, a cross-sectional view of a can bottom.

FIG. 4-2 is a view schematically showing an Example A of a cross-section of a bottom part of a battery cell case (container), in other words, a cross-sectional view of a can bottom.

FIG. 4-3 is a view schematically showing an Example B of a cross-section of a bottom part of a battery cell case (container), in other words, a cross-sectional view of a can bottom.

DESCRIPTION OF EMBODIMENTS

The cell case of a secondary battery according to one aspect of the present invention is a cell case of a secondary battery having a rectangular tube-shaped can body, a can bottom double seamed to a bottom end of the can body, and a can lid double seamed to a top end of the can body, wherein an area ratio S1 of part of the can bottom, comprised of a portion 1 between a plane vertical to the can body a distance of 0.5 mm above a bottom end of a double seam of the can body and the can bottom and a plane vertical to the can body a distance of 1.0 mm below the bottom end of the double seam, with respect to a cross-sectional area of the can body at the bottom end of the double seam is 50% or more.

The cell case of a secondary battery is a cell case of a secondary battery having a rectangular tube-shaped can body, a can bottom double seamed to a bottom end of the can body, and a can lid double seamed to a top end of the can body. The "can body" is a member forming the body part of the can. The can body is a rectangular tube shape. That is, the can body has the shape of a tube. The cross-section of the tube (can body) has a polygonal shape. As one example, the polygonal shape may be a triangular shape, quadrilateral shape, pentagonal shape, hexagonal shape, etc. By the cell case having a polygonal shape, when made into a battery module, the gaps between cell cases can be made smaller, that is, the layout efficiency rises, so this is preferable. The cross-section of the can body is most preferably a rectangular shape or a square shape. Further, considering the actual workability, improvement of strength, etc., the corner parts of the polygonal shape may have some arcs (curves). The can bottom is double seamed at the open part of the bottom end of the can body. the can lid is double seamed at the open part of the top end of the can body. Due to this, a cell case is formed. This cell case is for use for a secondary battery. A secondary battery is a battery able to be repeatedly charged and discharged and can be expected to be used over a longer period than a primary battery. For this reason, a cell case for a secondary battery is asked to be sounder than a cell case for a primary battery over a long period of time.

Figure 1:
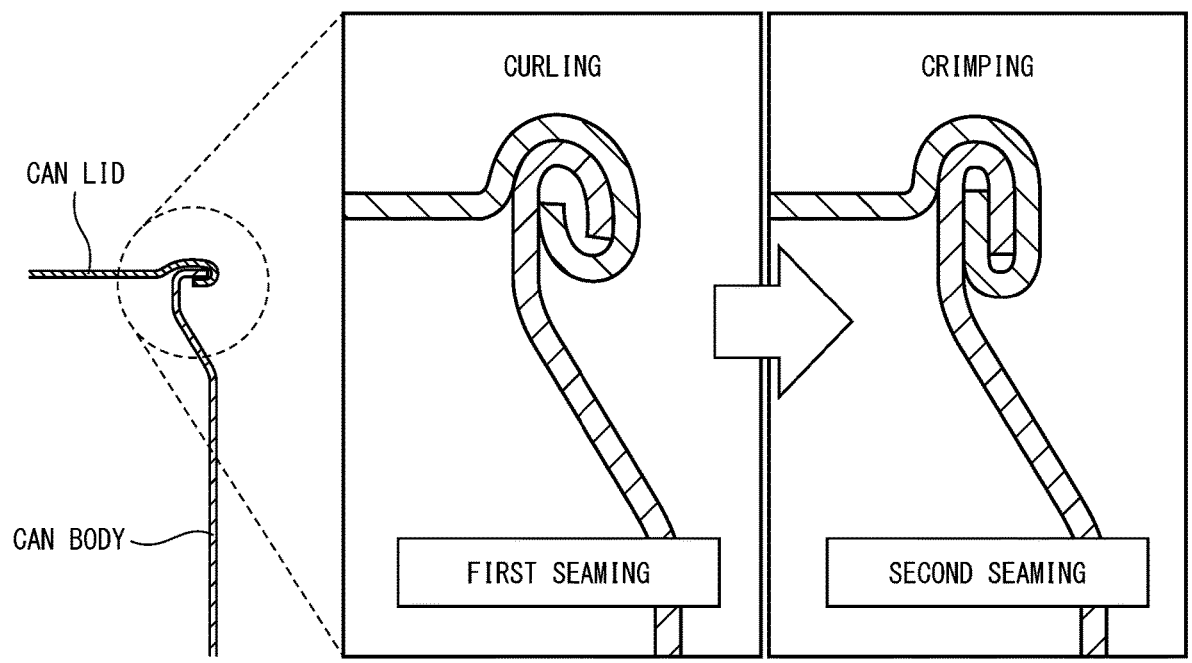
FIG. 1 is a view for explaining the general process of typical double seaming.

Double seaming will be explained next. The cell case has a double seam at bottom end of the can body and the can bottom and has a double seam at the top end of the can body and the can lid. As shown by the schematic process diagram of FIG. 1, double seaming joins an end part of a can body and an end part of a can bottom or can lid by curling a superposed location (first seaming step) and crimping the curled up location together (second seaming step). Inevitably, the double seam is present in a shape projecting out at the end part of the finished can (cell case). More particularly, "double seaming" indicates a work method of curling up the end part of the can body comprised of the flange part at the end part of the can bottom or can lid comprised of the rim part and tightening the curled up part to crimp together the end parts of the can body and the can bottom or can lid to join them and secure the seal of the inside of the finished can or a structural part formed by that technique. As shown in FIG. 1, the part of the can bottom or can lid and the part of the can body become double layered, so this is called "double seaming".

The routine of general double seaming will be explained next. The open part of the can body (end part) is bent to the outside by a press etc. to form a flange part. The flange part and the end part of the can bottom or can lid (rim) are superposed. The end part of the can bottom or can lid may also be curled up so as to fit the shape of the flange part of the can body. Further, at the time of superpositioning, the dimensions of the can body and can bottom may be adjusted so that the end part of the can bottom or can lid d sticks out from the flange part of the can body. Due to this, in the next curling up step (first seaming step), it becomes easier for the end part of the can bottom or can lid to curl up over the flange part of the can body. In the curling process, the location where the can bottom or can lid and the can body are superposed is pressed from the outside by a holding tool so as to curl up the end part of the can body at the end part of the can bottom or can lid. In the next crimping step (second seaming step), the holding tool is pressed against the curled up part to tighten the curled up part. Due to this, the end parts of the can bottom or can lid and the can body are crimped and joined together and the seal at the inside of the finished can is realized. Note that, in the curling up step and crimping step, if in the face of the pressing by the holding tool from the outside, the end parts of the bottom or can lid and the can body were to buckle, double seaming could not be performed, so it is possible to place a support part (holding ring etc.) against the inside surface side of the can body (acting as a wall) to provide support so as to not make the double seam buckle. It is also possible to place the support part above or below in accordance with the position of the double seam. For example, if forming a double seam at the can bottom and the can body, the support part may be placed at the can bottom side, in other words, from the bottom end side of the can body. If not attaching the can lid, it is also possible to place it from the opposite side to the can bottom, that is, to insert it from the open part of the top end of the can body. If placing the support part from the can bottom side, it is also possible to adjust the dimensions of the support part to make it smaller etc. so as not to interfere with other parts of the can bottom, for example, the center part of the can bottom etc. Here, the explanation was given of the example of a double seam of the can bottom and the can body, but in a double seam of the can lid and the can body, it is possible to apply references to the can bottom switched to the can lid.

Note that, double seaming is a work method simpler compared with welding etc. and enables sufficient hermeticity to be obtained, so the cell case of a secondary battery is improved in productivity and as a result the secondary battery is also improved in productivity.

Figure 2:
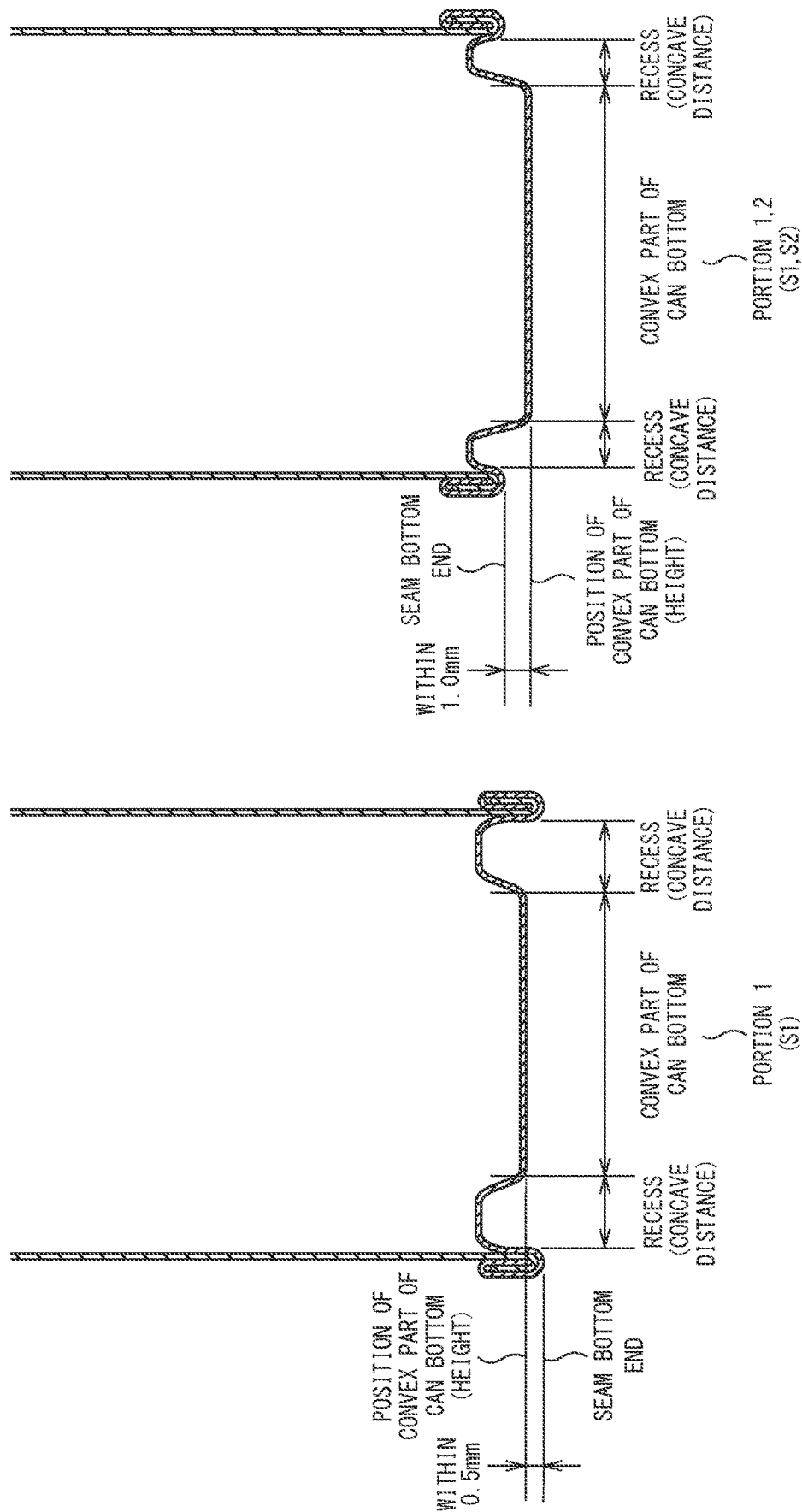
FIG. 2 is a general view for schematically explaining a positional relationship between a double seam and a can bottom in a cell case of a secondary battery according to one aspect of the present invention.

The bottom end of a double seam will be explained next. A double seam, as shown in FIG. 2, has a length in the vertical direction. Note that, in the "vertical direction", the can lid side is the upper direction and the can bottom side is the lower direction. The "bottom end" of the double seam means the end part of the double seam in the lower direction.

Part of the can bottom is made to be in a specific range with respect to the bottom end of the double seam in the vertical direction. Note that, the can bottom has thickness, that is, has an upper surface and lower surface in a cross-sectional view, so unless particularly indicated otherwise in the Description, regarding the position of the can bottom in the vertical direction, the "can bottom" shall indicate the position of the bottom surface of the can bottom in the vertical direction. FIG. 2 is a schematic view for understanding the range where part of the can bottom is positioned. As shown in FIG. 2, part of the can bottom is made to be between a plane vertical to the can body a distance of 0.5 mm above the bottom end of the double seam of the can body and the can bottom and a plane vertical to the can body a distance of 1.0 mm below the bottom end of the double seam of the can bottom. Below, the part of the can bottom comprised of the portion between the two planes is referred to as the Portion 1. (The bottom end of the double seam is defined as ±0.0 mm, the distance in the upper direction (displacement) from there (can lid direction) is expressed with "+" appended, and the distance in the lower direction (displacement) may be expressed with "−" appended.) By part of the can bottom (Portion 1) being within this range, when placing the part of the can bottom (Portion 1) on the cooling surface of the cooling device or cooling sheet, a sufficient cooling effect can be obtained. If the part of the can bottom is at a position above the plan vertical to the can body a distance of 0.5 mm above the bottom end of the double seam, that is, is above the range of the Portion 1, sometimes the lower surface of the can bottom can no longer efficiently contact the cooling surface or cooling sheet and a sufficient cooling effect cannot be obtained. On the other hand, if part of the can bottom is at a position below the plane vertical to the can body a distance of 1.0 mm below the bottom end of the double seam, that is, below the Portion 1, the bottom surface of the can bottom and the cooling surface or cooling sheet can be made to sufficiently contact each other, but it becomes necessary to work the can bottom part into a dish shape, sometimes the can itself is liable to become unstable in self standing ability, and the efficiency of double seaming work falls (specifically, in double seaming, it is necessary to place a support part (holding ring etc.) forming a wall at the inside of the can body, but the greater the distance between the double seam and can bottom, generally the more trouble involved in adjusting the support part and the lower the work efficiency) etc., so this is not preferable. Further, the dish-shaped can bottom part substantially has a structure similar to the closed bottom container of a two-piece can. A concern arises over insufficient can body strength.

Here, not all of the can bottom has to be this range. The ratio of area of the area of part of the can bottom in this range, that is, the area of the Portion 1, with respect to the inside cross-sectional area of the can body at the bottom end of the double seam, is defined as the area ratio (S1). If the area ratio S1 is 50% or more, a sufficient cooling effect can be obtained. If the area ratio (S1) is less than 50%, sometimes it is not possible to obtain a sufficient cooling effect. The larger the area ratio (S1), the higher the cooling effect. It may be preferably 55% or more, 60% or more, 65% or more, 70% or more, or 75% or more and is more preferably 80% or more or 90% or more. Furthermore, the area ratio may also be 100%. On the other hand, rather than the case where the position of the can bottom in the vertical direction is constant (that is, as shown in the schematic view of FIG. 2, the case where the can bottom is substantially flat), if the position of the can bottom in the vertical direction is not constant, that is, flat, but for example the can bottom has a suitable relief shape, the can bottom is improved in strength. This is also preferable from the viewpoint of workability. (Specifically, in double seaming, it is necessary to place a support part (holding ring etc.) forming a wall at the inside of the can body. If possible to place a support part (holding ring etc.) at the relief shape of the can bottom, the support part no longer has to be placed inserted from the open part of the can body, so this is sometimes preferable.)

From the viewpoint of the strength and workability, the area ratio S1 may be made less than 100%, more preferably may be made 90% or less, still more preferably may be made 80% or less. Note that, the "area" of the can bottom here is measured with the double seam cut off in the front view of the can bottom seen from below (projected view). That is, the area of the part corresponding to this double seam is not included.

Note that, the double seam may also be positioned near the outside of the side surface of the can body and may also be positioned near the inside of the side surface of the can body. However, if the double seam is positioned at the outside of the side surface of the can body, it is easy to adjust the vertical direction position with respect to the double seam of the can bottom, so this is preferable.

According to one aspect of the present invention, part of the can bottom may be between a plane vertical to the can body including the bottom end of the seam part and a plane vertical to the can body a distance of 1.0 mm below a bottom end of a double seam. Below, the part of the can bottom between the two planes will be referred to as the "Portion 2".

This aspect relates to the position of part of the can bottom in the vertical direction from the above-mentioned first aspect. The upward position is limited to the same position as the bottom end of the double seam. Due to this, part of the can bottom (Portion 2) can be more effectively contacted by the cooling surface of the cooling device or cooling sheet and the cooling efficiency can be raised.

In the present embodiment as well, not all of the can bottom has to be this range. The ratio of area of the area of part of the can bottom in the range of the present embodiment, that is, the area of the Portion 2, with respect to the inside cross-sectional area of the can body at the bottom end of the double seam, is defined as the area ratio S2. If the area ratio S2 is 50% or more, a sufficient cooling effect can be obtained. If the area ratio S2 is less than 50%, sometimes it is not possible to obtain a sufficient cooling effect. The larger the area ratio S2, the higher the cooling effect. It may be preferably 55% or more, 60% or more, 65% or more, 70% or more, or 75% or more and is more preferably 80% or more or 90% or more. Furthermore, the area ratio may also be 100%. On the other hand, rather than the case where the position of the can bottom in the vertical direction is constant (that is, as shown in the schematic view of FIG. 2, the case where the can bottom is substantially flat), if the position of the can bottom in the vertical direction is not constant, that is, flat, but for example the can bottom has a suitable relief shape, the can bottom is improved in strength.

This is also preferable from the viewpoint of workability. (Specifically, in double seaming, it is necessary to place a support part (holding ring etc.) forming a wall at the inside of the can body. If possible to place a support part (holding ring etc.) at the relief shape of the can bottom, the support part no longer has to be placed inserted from the open part of the can body, so this is sometimes preferable.)

From the viewpoint of the strength and workability, the area ratio S2 may be made less than 100%, more preferably may be made 90% or less, still more preferably may be made 80% or less. Note that, the "area" of the can bottom referred to here is measured with the double seam cut off in the front view of the can bottom seen from below (projected view). That is, the area of the part corresponding to this double seam is not included.

Note that, as an extreme example in this concept, sometimes, while maintaining an area ratio S1 of the Portion 1 or area ratio S2 of the Portion 2 of 50% or more, there is an extremely large (long) projection at a certain part of the can bottom, the Portion 1 or the Portion 2 cannot effectively contact the cooling surface of the cooling device or cooling sheet, and the cooling efficiency cannot be raised. However, a can bottom having such a projection is a special can bottom and is outside the scope of a can bottom according to the present invention. To exclude such a special shape of a can bottom, preferably none of the parts of the can bottom according to the present invention project downward more than 1.0 mm from the bottom end of the double seam.

In one aspect of the present invention, the sheet thickness of the can bottom may also be made 0.20 mm or less.

The can bottom is not particularly limited in sheet thickness so long as the it has strength as the can bottom of a cell case of a secondary battery, but from the viewpoints of lightening of the cell case, workability of double seaming, and improvement of the cooling efficiency, being thin is preferable. From these viewpoints, the sheet thickness of the can bottom may be made 0.20 mm or less. If the sheet thickness of the can bottom is too thin, sometimes the strength is liable to fall, so the lower limit may be made 0.10 mm. On the other hand, if the sheet thickness of the can bottom is too thick, the cell case becomes heavier, the workability of the double seaming falls, and the cooling effect falls, so the upper limit may be made 0.40 mm or 0.30 mm.

The can bottom, can body, or can lid of the present invention does not have to be particularly limited in material, but for example a material often used as a material for can use such as a steel material plated with Cr, plated with Sn, plated with Ni, plated with Cu, etc. or such as Al (including ones on one surface or both surfaces of which a film is laminated) can be used. Note that, as the materials of the film laminated on the steel material or Al, polypropylene (PP), polyethylene (PE), polyethylene terephthalate (PET) etc. can be used.

According to the present invention, a battery module having a plurality of cell cases of secondary batteries is also provided. The plurality of cell cases of secondary batteries are the above-mentioned cell cases of secondary batteries.

In the battery module of one aspect of the present invention, parts of the respective can bottoms of the plurality of battery cell cases of the above first aspect (those with area ratios S1 of the Portions 1 of 50% or more) (Portions 1) may contact thermal pads and the thermal pads may contact the cooling device.

In the cell case of one aspect, the ratio of area of the area of one part of the can bottom comprised of the Portion 1 between the plane vertical to the can body a distance of 0.5 mm above the bottom end of the double seam of the can body and the can bottom and the plane vertical to the can body a distance of 1.0 mm below the bottom end of the double seam with respect to the internal cross-sectional area of the can body at the bottom end of the double seam is defined as the area ratio S1, and the area ratio S1 is 50% or more. The Portion 1 can efficiently contact a thermal pad, and the area ratio S1 is 50% or more. For this reason, it is possible to easily make the area ratio S3 of the part of the can bottom contacting the thermal pad (with respect to inside cross-sectional area of can body at bottom end of double seam) 50% or more. Here, the area ratio S3, in the same way as the area ratio S1, is the area ratio of the part of the can bottom contacting the thermal pad (or (if using later explained cooling device instead of thermal pad) the cooling surface of the cooling device) (with respect to the inside cross-sectional area of the can body at the bottom end of the double seam) in the front view of the can bottom seen from the bottom surface (projected view). The area ratio S3 is preferably 55% or more, 60% or more, 65% or more, 70% or more, or 75% or more, more preferably 80% or more or 90% or more.

If part of the can bottom of an area ratio of 50% or more is positioned lower than the bottom end of the double seam (for example, see schematic view at right of FIG. 2), if placing the cell case at the cooling surface of a cooling device, the double seam will not become an obstacle, the part of the can bottom and the cooling surface of the cooling device can be made to contact each other, and a sufficient cooling effect can be obtained. It is possible to place a thermal pad between the cooling surface of the cooling device and part of the can bottom (Portion 1) and make parts of the can bottoms of a plurality of cell cases (Portions 1) contact the thermal pad and make the thermal pad contact a cooling device. Due to this, even if a fine space was present between the cooling surface of the cooling device and part of the can bottom (Portion 1), the state becomes one where that space is filled with the thermal pad, so the cooling effect is further raised.

If most or all of a can bottom is positioned above the bottom end of a double seam (see schematic view of left of FIG. 2), if placing a cell case at the cooling surface of a cooling device, sometimes the double seam contacts the cooling surface, the part of the can bottom and the cooling surface of the cooling device cannot be made to contact each other, and a sufficient cooling effect cannot be obtained. However, in this aspect, part of the can bottom (Portion 1) can be made to contact the thermal pad and the thermal pad can be made to contact (the cooling surface of) the cooling device. Due to this, part of the can bottom (Portion 1) and the cooling surface of the cooling device can be made to contact each other through a thermal pad and a sufficient cooling effect can be obtained.

Further, in a battery module of another aspect of the present invention, the parts of the respective can bottoms (Portions 2) of the plurality of battery cell cases (those with area ratios S2 of the Portions 2 of 50% or more) of the above second aspect may contact thermal pads and the thermal pads may contact cooling devices.

The Portion 2 is included in the Portion 1. Specifically, the Portion 2, compared to the Portion 1, is limited in the upper position in the vertical direction to the same position as the bottom end of the double seam. Therefore, the Portion 2 can contact the thermal pad in the same way as the Portion 1, or more efficiently than the Portion 1. Due to this, part of the can bottom (Portion 2) and the cooling surface of the cooling device can be made to contact each other through the thermal pad and a sufficient cooling effect can be obtained.

The thermal pad is not particularly limited so long as having thermal conductivity corresponding to the cooling ability demanded by the battery. A commercially available one may be used. One having flexibility is preferable on the point of raising the closeness of contact of the can bottom and cooling surface. Further, one having a high insulating ability is preferable on the point of being able to suppress short-circuits of the battery etc. To improve the heat conduction, it may also be one in which copper, aluminum, or other metal material having a high thermal conductivity etc. is dispersed and blended. As one example, one comprised of a silicone-based or nonsilicone-based thermal conductivity resin layer carried on a base film (for example, the "Thermal Conductivity HT Sheet" made by Nitto Silicone etc.), one comprised of a silicone gel sheet-like member in which a ceramic having thermal conductivity is dispersed or comprised of this silicone gel carried on a base made of fiber glass etc. is suitably used.

In the battery module of one aspect of the present invention, the Portion 2 of the cell case of the other aspect (one where the area ratio S2 of the Portion 2 is 50% or more) may directly contact the cooling device.

In this aspect, 50% or more of the area of the can bottom is positioned lower than the bottom end of the double seam (see schematic view of right of FIG. 2), so if placing the cell case at the cooling surface of the cooling device, the double seam will not become an obstacle, the Portion 2 of the can bottom and the cooling surface of the cooling device can be made to contact each other, and a sufficient cooling effect can be obtained.

EXAMPLES

Below, examples will be shown while explaining the battery cell case according to one embodiment of the present invention in more detail. Note that, the examples shown below are just single illustrations of the battery cell case according to the present embodiments. The battery cell case according to the present embodiment is not limited to the examples shown below.

Battery cell cases were prepared under the various conditions shown in Table 1 and were subjected to cooling tests. The prepared battery cell cases were all prismatic can types (cross-sectional shapes of can bodies were rectangular).

Here, "TFS" means Cr plated steel sheet. "Can Super" made by Nippon Steel Corporation of a temper grade of T-2 was used.

"Tin plate" means Sn plated steel sheet. Tin-plated steel sheet made by Nippon Steel Corporation of a temper grade of T-2 with a plating deposition on the front and back of 5.6 g/m$^2$ was used.

"Ni" means Ni plated steel sheet. "Super Nickel" made by Nippon Steel Corporation of a temper grade of T-2 with a plating deposition on the front and back of 8.9 g/m$^2$ was used.

"Cu" means Cu plated steel sheet. A base sheet of a temper grade of T-2 on the front and back of which 3 μm of Cu was electroplated was used.

"Al" means Al sheet. Al 100 was used.

Further, the "PP" of the film means polypropylene, "PE" polyethylene, and "PET" polyethylene terephthalate.

TABLE 1

Conditions and Results of Cooling Test

| | | | | | | | Can body | | Can bottom | | Can lid |
|---|---|---|---|---|---|---|---|---|---|---|---|
| | | Cell case | | | | Sheet | Film | Sheet | Film | Sheet |
| | No. | Width mm | Thick. mm | Height mm | R mm | thick. mm | Base | Inside/outside surface | thick. mm | Base | Inside/outside surface | thick. mm | Base |
| Ref. | 1 | 148 | 26.5 | 91 | 5 | 0.30 | TFS | PP/PET | 0.30 | TFS | PP/PET | 0.30 | TFS |
| Ex. | 1-1 | 148 | 26.5 | 91 | 5 | 0.30 | TFS | PP/PET | 0.30 | TFS | PP/PET | 0.30 | TFS |
| Ex. | 1-2 | 148 | 26.5 | 91 | 5 | 0.30 | TFS | PP/PET | 0.30 | TFS | PP/PET | 0.30 | TFS |
| Ex. | 1-3 | 148 | 26.5 | 91 | 5 | 0.30 | TFS | PP/PET | 0.30 | TFS | PP/PET | 0.30 | TFS |
| Comp. ex. | 1-4 | 148 | 26.5 | 91 | 5 | 0.30 | TFS | PP/PET | 0.30 | TFS | PP/PET | 0.30 | TFS |
| Comp. ex. | 1-5 | 148 | 26.5 | 91 | 5 | 0.30 | TFS | PP/PET | 0.30 | TFS | PP/PET | 0.30 | TFS |
| Ex. | 1-6 | 148 | 26.5 | 91 | 5 | 0.30 | TFS | PP/PET | 0.30 | TFS | PP/PET | 0.30 | TFS |
| Ex. | 1-7 | 148 | 26.5 | 91 | 5 | 0.30 | TFS | PP/PET | 0.30 | TFS | PP/PET | 0.30 | TFS |
| Ex. | 1-8 | 148 | 26.5 | 91 | 5 | 0.30 | TFS | PP/PET | 0.30 | TFS | PP/PET | 0.30 | TFS |
| Ex. | 1-9 | 148 | 26.5 | 91 | 5 | 0.30 | TFS | PP/PET | 0.30 | TFS | PP/PET | 0.30 | TFS |
| Ex. | 1-10 | 148 | 26.5 | 91 | 5 | 0.30 | TFS | PP/PET | 0.30 | TFS | PP/PET | 0.30 | TFS |
| Ex. | 1-11 | 148 | 26.5 | 91 | 5 | 0.30 | TFS | PP/PET | 0.20 | TFS | PP/PET | 0.30 | TFS |
| Ex. | 1-12 | 148 | 26.5 | 91 | 5 | 0.30 | TFS | PP/PET | 0.15 | TFS | PP/PET | 0.30 | TFS |
| Ex. | 1-13 | 148 | 26.5 | 91 | 5 | 0.30 | TFS | PP/PET | 0.10 | TFS | PP/PET | 0.30 | TFS |
| Ex. | 1-14 | 148 | 26.5 | 91 | 5 | 0.30 | TFS | PP/PET | 0.30 | TFS | PP/PET | 0.30 | Al |
| Ex. | 1-15 | 148 | 26.5 | 91 | 5 | 0.30 | TFS | PP/PET | 0.30 | TFS | PP/PET | 0.30 | Al |
| Ex. | 1-16 | 148 | 26.5 | 91 | 5 | 0.30 | TFS | PP/PET | 0.30 | TFS | PP/PET | 0.30 | Al |
| Ex. | 1-17 | 148 | 26.5 | 91 | 5 | 0.30 | Tin plate | PP/PET | 0.30 | Tin plate | PP/PET | 0.30 | Tin plate |
| Ex. | 1-18 | 148 | 26.5 | 91 | 5 | 0.30 | Ni | PP/PET | 0.30 | Ni | PP/PET | 0.30 | Ni |
| Ex. | 1-19 | 148 | 26.5 | 91 | 5 | 0.30 | Cu | PP/PET | 0.30 | Cu | PP/PET | 0.30 | Cu |
| Ex. | 1-20 | 148 | 26.5 | 91 | 5 | 0.30 | TFS | PE/PET | 0.30 | TFS | PE/PET | 0.30 | TFS |
| Ex. | 1-21 | 148 | 26.5 | 91 | 5 | 0.30 | TFS | PP/PP | 0.30 | TFS | PP/PP | 0.30 | TFS |
| Ex. | 1-22 | 148 | 26.5 | 91 | 5 | 0.30 | TFS | PE/PE | 0.30 | TFS | PE/PE | 0.30 | TFS |
| Ex. | 1-23 | 148 | 26.5 | 91 | 5 | 0.30 | TFS | PP/PET | 0.30 | TFS | PP/PET | 0.30 | TFS |
| Ex. | 1-24 | 148 | 26.5 | 91 | 5 | 0.30 | TFS | PP/PET | 0.30 | TFS | PP/PET | 0.30 | TFS |
| Comp. ex. | 1-25 | 148 | 26.5 | 91 | 5 | 0.30 | TFS | PP/PET | 0.30 | TFS | PP/PET | 0.30 | TFS |
| Comp. ex. | 1-26 | 148 | 26.5 | 91 | 5 | 0.30 | TFS | PP/PET | 0.15 | TFS | PP/PET | 0.30 | TFS |

TABLE 1-continued

Conditions and Results of Cooling Test

| | | | | | | | | | | | | | | |
|---|---|---|---|---|---|---|---|---|---|---|---|---|---|---|
| Comp. ex. | 1-27 | 148 | 26.5 | 91 | 5 | 0.30 | TFS | PP/PET | 0.30 | TFS | PP/PET | 0.30 | TFS |
| Comp. ex. | 1-28 | 148 | 26.5 | 91 | 5 | 0.30 | TFS | PP/PET | 0.30 | TFS | PP/PET | 0.30 | TFS |
| Ref. | 2 | 148 | 26.5 | 91 | 10 | 0.30 | TFS | PP/PET | 0.30 | TFS | PP/PET | 0.30 | TFS |
| Ex. | 2-1 | 148 | 26.5 | 91 | 10 | 0.30 | TFS | PP/PET | 0.30 | TFS | PP/PET | 0.30 | TFS |
| Ex. | 2-2 | 148 | 26.5 | 91 | 10 | 0.30 | TFS | PP/PET | 0.30 | TFS | PP/PET | 0.30 | TFS |
| Comp. ex. | 2-3 | 148 | 26.5 | 91 | 10 | 0.30 | TFS | PP/PET | 0.30 | TFS | PP/PET | 0.30 | TFS |
| Ex. | 2-4 | 148 | 26.5 | 91 | 10 | 0.30 | TFS | PP/PET | 0.15 | TFS | PP/PET | 0.30 | TFS |
| Ref. | 3 | 173 | 45 | 115 | 5 | 0.30 | TFS | PP/PET | 0.30 | TFS | PP/PET | 0.30 | TFS |
| Ex. | 3-1 | 173 | 45 | 115 | 5 | 0.30 | TFS | PP/PET | 0.30 | TFS | PP/PET | 0.30 | TFS |
| Ex. | 3-2 | 173 | 45 | 115 | 5 | 0.30 | TFS | PP/PET | 0.30 | TFS | PP/PET | 0.30 | TFS |
| Comp. ex. | 3-3 | 173 | 45 | 115 | 5 | 0.30 | TFS | PP/PET | 0.30 | TFS | PP/PET | 0.30 | TFS |
| Ex. | 3-4 | 173 | 45 | 115 | 5 | 0.30 | TFS | PP/PET | 0.20 | TFS | PP/PET | 0.30 | TFS |
| Ref. | 4 | 173 | 45 | 115 | 10 | 0.30 | TFS | PP/PET | 0.30 | TFS | PP/PET | 0.30 | TFS |
| Ex. | 4-1 | 173 | 45 | 115 | 10 | 0.30 | TFS | PP/PET | 0.30 | TFS | PP/PET | 0.30 | TFS |
| Ex. | 4-2 | 173 | 45 | 115 | 10 | 0.30 | TFS | PP/PET | 0.30 | TFS | PP/PET | 0.30 | TFS |
| Comp. ex. | 4-3 | 173 | 45 | 115 | 10 | 0.30 | TFS | PP/PET | 0.30 | TFS | PP/PET | 0.30 | TFS |
| Comp. ex. | 4-4 | 173 | 45 | 115 | 10 | 0.30 | TFS | PP/PET | 0.30 | TFS | PP/PET | 0.30 | TFS |
| Ex. | 4-5 | 173 | 45 | 115 | 10 | 0.30 | TFS | PP/PET | 0.30 | TFS | PP/PET | 0.30 | TFS |
| Comp. ex. | 4-6 | 173 | 45 | 115 | 10 | 0.30 | TFS | PP/PET | 0.30 | TFS | PP/PET | 0.30 | TFS |
| Ex. | 4-7 | 173 | 45 | 115 | 10 | 0.15 | TFS | PP/PET | 0.15 | TFS | PP/PET | 0.30 | TFS |
| Comp. ex. | 4-8 | 173 | 45 | 115 | 10 | 0.15 | TFS | PP/PET | 0.20 | TFS | PP/PET | 0.30 | +TFS |
| Ref. | 5 | 148 | 26.5 | 91 | 5 | 0.30 | TFS | PP/PET | 0.30 | TFS | PP/PET | 0.30 | TFS |
| Ex. | 5-1 | 148 | 26.5 | 91 | 5 | 0.30 | TFS | PP/PET | 0.30 | TFS | PP/PET | 0.30 | TFS |
| Ex. | 5-2 | 148 | 26.5 | 91 | 5 | 0.30 | TFS | PP/PET | 0.30 | TFS | PP/PET | 0.30 | TFS |
| Ex. | 5-3 | 148 | 26.5 | 91 | 5 | 0.30 | TFS | PP/PET | 0.30 | TFS | PP/PET | 0.30 | TFS |
| Comp. ex. | 5-4 | 148 | 26.5 | 91 | 5 | 0.30 | TFS | PP/PET | 0.30 | TFS | PP/PET | 0.30 | TFS |

| | Can lid Film Inside/ outside surface | Recess (concave part) mm | Can bottom convex part rate | Position of convex part with respect to double seamed part mm | Area ratio S1 (%) | Area ratio S2 (%) | Area ratio S3 (%) | Thermal pad | Time difference to 40° C. sec | Result of evaluation |
|---|---|---|---|---|---|---|---|---|---|---|
| Ref. | PP/PET | — | 0.0% | (+3.0) | 0 | 0 | 0 | Yes | | Base |
| Ex. | PP/PET | 0.0 | 100.0% | ±0.0 | 100.0 | 100.0 | 100.0 | Yes | 29 | Excellent |
| Ex. | PP/PET | 1.5 | 87.1% | ±0.0 | 87.1 | 87.1 | 87.1 | Yes | 28 | Excellent |
| Ex. | PP/PET | 5.0 | 58.4% | ±0.0 | 58.4 | 58.4 | 58.4 | Yes | 16 | Good |
| Comp. ex. | PP/PET | 10.0 | 20.8% | ±0.0 | 20.8 | 20.8 | 20.8 | Yes | 5 | Bad |
| Comp. ex. | PP/PET | 5.0 | 58.4% | ±1.0 | 0 | 0 | 0 | Yes | 1 | Bad |
| Ex. | PP/PET | 5.0 | 58.4% | ±0.5 | 58.4 | 0 | 58.4 | Yes | 11 | Good |
| Ex. | PP/PET | 5.0 | 58.4% | ±0.2 | 58.4 | 0 | 58.4 | Yes | 13 | Good |
| Ex. | PP/PET | 5.0 | 58.4% | −0.2 | 58.4 | 58.4 | 58.4 | Yes | 15 | Good |
| Ex. | PP/PET | 5.0 | 58.4% | −0.5 | 58.4 | 58.4 | 58.4 | Yes | 16 | Good |
| Ex. | PP/PET | 5.0 | 58.4% | −1.0 | 58.4 | 58.4 | 58.4 | Yes | 15 | Good |
| Ex. | PP/PET | 5.0 | 58.4% | ±0.0 | 58.4 | 58.4 | 58.4 | Yes | 24 | Excellent |
| Ex. | PP/PET | 5.0 | 58.4% | ±0.0 | 58.4 | 58.4 | 58.4 | Yes | 28 | Excellent |
| Ex. | PP/PET | 5.0 | 58.4% | ±0.0 | 58.4 | 58.4 | 58.4 | Yes | 30 | Excellent |
| Ex. | PP/PET | 5.0 | 58.4% | ±0.0 | 58.4 | 58.4 | 58.4 | Yes | 16 | Good |
| Ex. | — | 5.0 | 58.4% | ±0.0 | 58.4 | 58.4 | 58.4 | Yes | 15 | Good |
| Ex. | PP/- | 5.0 | 58.4% | ±0.0 | 58.4 | 58.4 | 58.4 | Yes | 15 | Good |
| Ex. | PP/PET | 5.0 | 58.4% | ±0.0 | 58.4 | 58.4 | 58.4 | Yes | 16 | Good |
| Ex. | PP/PET | 5.0 | 58.4% | ±0.0 | 58.4 | 58.4 | 58.4 | Yes | 15 | Good |
| Ex. | PP/PET | 5.0 | 58.4% | ±0.0 | 58.4 | 58.4 | 58.4 | Yes | 17 | Good |
| Ex. | PE/PET | 5.0 | 58.4% | ±0.0 | 58.4 | 58.4 | 58.4 | Yes | 16 | Good |
| Ex. | PP/PP | 5.0 | 58.4% | ±0.0 | 58.4 | 58.4 | 58.4 | Yes | 15 | Good |
| Ex. | PE/PE | 5.0 | 58.4% | ±0.0 | 58.4 | 58.4 | 58.4 | Yes | 16 | Good |
| Ex. | PP/PET | 3.0 | 74.5% | ±0.0 | 74.5 | 74.5 | 74.5 | Yes | 23 | Very Good |
| Ex. | PP/PET | 2.5 | 78.7% | ±0.0 | 78.7 | 78.7 | 78.7 | Yes | 25 | Excellent |
| Comp. ex. | PP/PET | 7.0 | 42.9% | ±0.0 | 42.9 | 42.9 | 42.9 | Yes | 8 | Bad |
| Comp. ex. | PP/PET | 10.0 | 20.8% | ±0.0 | 20.8 | 20.8 | 20.8 | Yes | 8 | Bad |
| Comp. ex. | PP/PET | 5.0 | 58.4% | ±0.7 | 0 | 0 | 0 | Yes | 0 | Bad |
| Comp. ex. | PP/PET | 5.0 | 58.4% | −1.2 | 0 | 0 | 0 | Yes | *1 | Bad |
| Ref. | PP/PET | — | 0.0% | (+3.0) | 0 | 0 | 0 | Yes | | Base |
| Ex. | PP/PET | 5.0 | 58.8% | ±0.0 | 58.8 | 58.8 | 58.8 | Yes | 16 | Good |
| Ex. | PP/PET | 2.5 | 78.9% | ±0.0 | 78.9 | 78.9 | 78.9 | Yes | 26 | Excellent |
| Comp. ex. | PP/PET | 7.0 | 43.5% | ±0.0 | 43.5 | 43.5 | 43.5 | Yes | 8 | Bad |
| Ex. | PP/PET | 5.0 | 58.8% | ±0.0 | 58.8 | 58.8 | 58.8 | Yes | 29 | Excellent |
| Ref. | PP/PET | — | 0.0% | (+3.0) | 0 | 0 | 0 | Yes | | Base |
| Ex. | PP/PET | 5.0 | 73.5% | ±0.0 | 73.5 | 73.5 | 73.5 | Yes | 23 | Very Good |
| Ex. | PP/PET | 4.0 | 78.6% | ±0.0 | 78.6 | 78.6 | 78.6 | Yes | 26 | Excellent |
| Comp. ex. | PP/PET | 10.0 | 49.0% | ±0.0 | 49.0 | 49.0 | 49.0 | Yes | 9 | Bad |
| Ex. | PP/PET | 5.0 | 73.5% | ±0.0 | 73.5 | 73.5 | 73.5 | Yes | 28 | Excellent |
| Ref. | PP/PET | — | 0.0% | (+3.0) | 0 | 0 | 0 | Yes | | Base |
| Ex. | PP/PET | 5.0 | 73.8% | ±0.0 | 73.8 | 73.8 | 73.8 | Yes | 22 | Very Good |
| Ex. | PP/PET | 9.0 | 54.3% | ±0.0 | 54.3 | 54.3 | 54.3 | Yes | 16 | Good |

TABLE 1-continued

Conditions and Results of Cooling Test

| Comp. ex. | PP/PET | 14.0 | 31.8% | ±0.0 | 31.8 | 31.8 | 31.8 Yes | 7 | Bad |
|---|---|---|---|---|---|---|---|---|---|
| Comp. ex. | PP/PET | 5.0 | 73.8% | ±1.0 | 0 | 0 | 0 Yes | 1 | Bad |
| Ex. | PP/PET | 4.0 | 78.9% | ±0.0 | 78.9 | 78.9 | 78.9 Yes | 26 | Excellent |
| Comp. ex. | PP/PET | 12.0 | 40.6% | ±0.0 | 40.6 | 40.6 | 40.6 Yes | 7 | Bad |
| Ex. | PP/PET | 9.0 | 54.3% | ±0.0 | 54.3 | 54.3 | 54.3 Yes | 29 | Excellent |
| Comp. ex. | PP/PET | 14.0 | 31.8% | ±0.0 | 31.8 | 31.8 | 31.8 Yes | 8 | Bad |
| Ref. | PP/PET | — | 0.0% | (+3.0) | 0 | 0 | 0 No | | Base |
| Ex. | PP/PET | 0.0 | 100.0% | ±0.0 | 100.0 | 100.0 | 100.0 No | 29 | Excellent |
| Ex. | PP/PET | 1.5 | 87.1% | ±0.0 | 87.1 | 87.1 | 87.1 No | 32 | Excellent |
| Ex. | PP/PET | 5.0 | 58.4% | ±0.0 | 58.4 | 58.4 | 58.4 No | 11 | Good |
| Comp. ex. | PP/PET | 10.0 | 20.8% | ±0.0 | 20.8 | 20.8 | 20.8 No | 7 | Bad |

*1: Self standing ability on thermal pad poor and evaluation not possible.
+ means displacement in upper direction, while − means displacement in lower direction.

Figure 3:
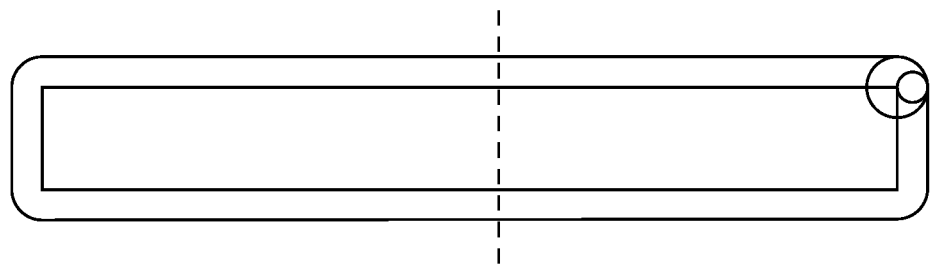
FIG. 3 is a bottom view of a cell case of a secondary battery, in other words, a view of the can bottom as seen from the front.

The items of Table 1 will be explained next. First, Table 1 describes the shape and dimensions of the "cell case", the sheet thickness, material, and film material of the "can body", "can bottom", and "can lid" forming the cell case, and the "can bottom area". Note that, the "can bottom area" is the inside cross-sectional area of the can body at the bottom end of the double seam. This will be explained while referring to FIG. 3. FIG. 3 is a bottom view of the battery cell case and a view showing the can bottom as seen from the front in the state with the double seam cut off.

Figures 1, 4:
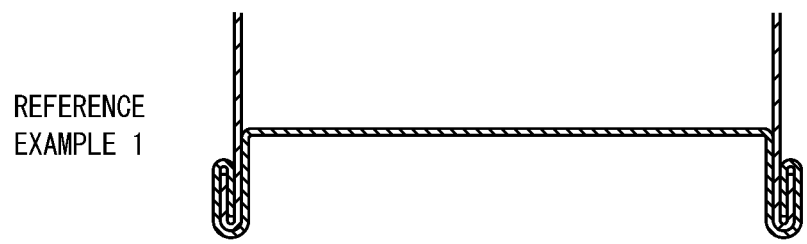
Figures 2, 4:
Figures 3, 4:
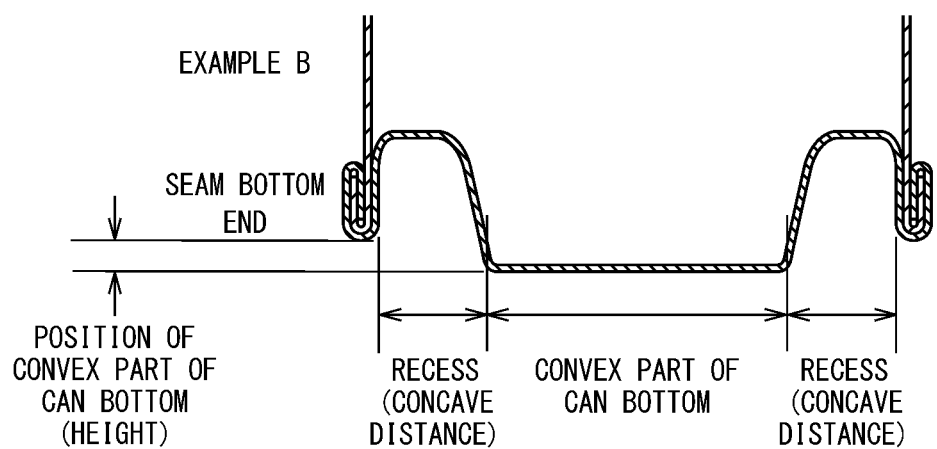

Table 1 describes a "recess (concave distance)", "can bottom convex part ratio", and "position of convex part with respect to double seam". These terms will be explained next with reference to FIG. 4-1 to FIG. 4-3. FIG. 4-1 to FIG. 4-3 are views schematically showing a vertical cross-section of the bottom part of a cell case, in other words, the vertical cross-sectional shape of a can bottom. FIG. 4-1 and FIG. 4-2 respectively show Reference Example 1 and Example A. These can bottoms have flat shapes. FIG. 4-3 shows Example B. The can bottom has a convex type shape (downward facing convex part).

The "recess (concave distance)" of Table 1 indicates the distance until transitioning from the end part of the can bottom (outer circumference part) to the convex shape in the case where the can bottom is a convex shape (see schematic view of Example B of FIG. 4-3). In the schematic views of Reference Example 1 (FIG. 4-1) and Example A (FIG. 4-2), the "recess (concave distance)" becomes "−" or "0 (mm)".

The "can bottom convex part ratio" is the "area of can bottom convex part" divided by the "can bottom area". Here, the "area of can bottom convex part" is the area of the convex part of the can bottom and is the "can bottom area" minus the area of the "recess (concave distance)" of the can bottom. In general, the smaller the "recess (concave distance)", the larger the "area of can bottom convex part" and also the larger of the "can bottom convex part ratio" (see FIG. 4-3). If the can bottom is shaped such as shown in FIG. 4-2, the "can bottom convex part ratio" becomes 100%. Note that, if the can bottom is shaped such as shown in FIG. 4-1, the can bottom does not have a convex part and the "can bottom convex part ratio" becomes 0%.

The "position of convex part with respect to double seam" show the position of the convex part of the can bottom in the vertical direction with respect to the bottom end of the double seam. A positive (+) value is the distance in the upper direction away from the bottom end of the double seam, while a negative (−) value is the distance in the lower direction away from the top end of the double seam. "±0.0 (mm)" shows that the position of the can bottom in the vertical direction is the same as the bottom end of the double seam. Note that, the can bottom has thickness, that is, has an upper surface and lower surface in a cross-sectional view, so unless particularly indicated otherwise in the Description, the position of the convex part of the can bottom in the vertical direction shall indicate the position of the bottom surface at the convex part of the can bottom. Note that, in the reference examples, as shown in FIG. 4-1, there is no convex part, but the position of the can bottom is a position 3.0 mm in the upper direction away from the bottom end of the double seam. In Table 1, the "position of convex part with respect to seam" of the reference examples is indicated for reference as "(+3.0 mm)".

For this reason, the "can bottom convex part ratio" can correspond to the area ratios S1 and S2 according to the present invention. When the "position of convex part with respect to seam" is +0.5 mm to −1.0 mm, the "can bottom convex part ratio" corresponds to the area ratio S1 according to the present invention, while when the "position of convex part with respect to seam" is ±0.0 mm to −1.0 mm, the "can bottom convex part ratio" corresponds to the area ratio S2 according to the present invention.

(Cooling Test: Method of Evaluation)

Using cell cases fabricated under the conditions shown in Table 1, lithium ion batteries were prepared. Each battery was heated in a 60° C. constant temperature bath for 12 hours and placed on a 10° C. cooling device in a 20° C. room directly or via a thickness 1.5 mm thermal conductivity 3 W/mK thermal pad. At that time, if the time until the temperature of the center part of the side surface of the can fell down to 40° C. became shorter than the reference example (base) by 10 seconds or more, the cell case was evaluated as "good", if shorter by 20 seconds or more, as "very good", and if shorter by 25 or more as "excellent". If the difference was less than 10 seconds, it was evaluated as "bad". The results are shown in Table 1. Note that, regarding the numbers (no.) of the examples, comparative examples, etc., examples etc. having initial numbers of 1 to 4 (e.g.: No. 1-_, No. 2-_, etc.) have batteries placed on cooling devices through thermal pads while examples etc. having initial numbers of 5 (e.g.: No. 5-_ etc.) do not use thermal pads and have batteries directly placed on the cooling devices.

In the invention examples, it was confirmed that good results of the cooling tests were obtained. In particular, Example 1-1, Example 1-2, Example 1-24, Example 2-2, Example 3-2, Example 4-5, Example 5-1, and Example 5-2 were examples which had positions of the convex parts with respect to the double seams of ±0.0 (mm) and had high can bottom convex part ratios, that is, contact areas with the cooling devices (70% or more), so the results of evaluation were "excellent". Further, Examples 1-11, 1-12, 1-13, 2-4, 3-4, and 4-7 were examples which had positions of the convex parts with respect to the double seams of ±0.0 (mm) and had sheet thicknesses of the can bottoms of 0.10 to 0.20 mm, or thinner than others (0.30 mm), so the results of evaluation were "excellent". In shapes inside the scope of the present invention, the results of evaluation were "good", "very good", or "excellent". However, in shapes outside the scope of the present invention, the results of evaluation were "bad". Specifically, Comparative Examples 1-4, 1-25, 1-26, 2-3, 3-3, 4-3, 4-6, 4-8, and 5-4 had positions of the convex parts with respect to the double seams of ±0.0 (mm), but the can bottom convex part ratios, that is, the contact areas with the cooling devices, were low (less than 50%), so the results of evaluation were "bad". Comparative Examples 1-5, 1-27, and 4-4 had can bottom convex part ratios, that is, the areas able to contact the cooling devices, of 50% or more, but the positions of the convex parts with respect to the double seams were more than ±0.5 (mm), the can bottom convex parts and the cooling devices were separated in distance, and the contact was not sufficient, so the results of evaluation were "bad".

Further, Comparative Example 1-28 had a can bottom convex part ratio, that is, an area able to contact the cooling device, of 50% or more, but had a position of the convex part with respect to the double seam of −1.2 (mm) and was poor in self standing ability on the thermal pad, so the cooling time could not be evaluated by the reproducibility.

Note that, in Examples 1-1 and 5-1, the can bottom convex part ratios were 100%, in other words, the can bottoms were completely flat (see FIG. 4-2). At the time of double seaming, support parts (holding rings) were placed at the insides of the can bodies, so the insides of the cans were washed after that. Further, in Example 1-2, the can bottom convex part ratio was about 90%. As the support parts for double seaming, inset-type dedicated dies were used for double seaming. If like in Examples 1-24, 2-2, 3-2, and 4-5, the can bottom convex part ratio was 80% or less, it was possible to place general support parts (holding rings) from the can bottom side for double seaming. Inside washing and dedicated dies were not necessary.

The invention claimed is:

1. A cell case of a secondary battery comprising:
   a rectangular tube-shaped can body,
   a can bottom double seamed to a bottom end of the can body, and
   a can lid double seamed to a top end of the can body, in which cell case of a secondary battery,
   wherein the can bottom has a relief shape, where the relief shape includes a convex shape comprising a can bottom convex part with a center part of the can bottom facing downward and a concave shape comprising a recess with a region between an outer circumference part of the can bottom and the convex shape part further approaching the can lid than the double seam of the can bottom,
   wherein a part of the can bottom convex part includes a portion 1 between:
   a plane vertical to the can body a distance of 0.5 mm above a bottom end of a double seam of the can body and the can bottom, and
   a plane vertical to the can body a distance of 1.0 mm below the bottom end of the double seam of the can body and the can bottom, in a cross-sectional view of the can body and the double seam of the can body and the can bottom, and
   wherein an area ratio S1 of the portion 1 with respect to a cross-sectional area of the can body at the bottom end of the double seam of the can body and the can bottom is 50% or more and 90% or less.

2. The cell case of a secondary battery according to claim 1, wherein an area ratio S2 of part of the can bottom convex part, comprised of a portion 2 between a plane vertical to the can body including the bottom end of the double seam of the can body and the can bottom and a plane vertical to the can body a distance of 1.0 mm below the bottom end of the double seam of the can body and the can bottom, with respect to the cross-sectional area of the can body at the bottom end of the double seam of the can body and the can bottom is 50% or more and 90% or less.

3. The cell case of a secondary battery according to claim 1, wherein the area ratio S1 is 80% or less.

4. The cell case of a secondary battery according to claim 2, wherein the area ratio S2 is 80% or less.

5. The cell case of a secondary battery according to claim 1, wherein the area ratio S1 is 70% or more.

6. The cell case of a secondary battery according to claim 2, wherein the area ratio S2 is 70% or more.

7. The cell case of a secondary battery according to claim 1, wherein at least part of a recess is positioned above a top end of the double seam of the can body and the can bottom.

8. The cell case of a secondary battery according to claim 1, wherein a sheet thickness of the can bottom is 0.20 mm or less.

9. The cell case of a secondary battery according to claim 1, wherein a sheet thickness of the can bottom is 0.15 mm or more.

10. The cell case of a secondary battery according to claim 2, wherein at least part of a recess is positioned above a top end of the double seam of the can body and the can bottom.

11. The cell case of a secondary battery according to claim 3, wherein at least part of a recess is positioned above a top end of the double seam of the can body and the can bottom.

12. The cell case of a secondary battery according to claim 4, wherein at least part of a recess is positioned above a top end of the double seam of the can body and the can bottom.

13. The cell case of a secondary battery according to claim 5, wherein at least part of a recess is positioned above a top end of the double seam of the can body and the can bottom.

14. The cell case of a secondary battery according to claim 6, wherein at least part of a recess is positioned above a top end of the double seam of the can body and the can bottom.

15. The cell case of a secondary battery according to claim 2, wherein a sheet thickness of the can bottom is 0.20 mm or less.

16. The cell case of a secondary battery according to claim 3, wherein a sheet thickness of the can bottom is 0.20 mm or less.

17. The cell case of a secondary battery according to claim 4, wherein a sheet thickness of the can bottom is 0.20 mm or less.

18. The cell case of the secondary batter according to claim 1,
   wherein the concave shape of the can bottom includes a side away from the convex part and between the region and the outer circumference part that continuously tapers from the outer circumference part to a deepest portion of the concave shape.

* * * * *